United States Patent

[11] 3,593,207

[72] Inventors James D. Woermbke
Tampa, Fla.;
Herbert Warren Cooper, Hyattsville, Md.

[21] Appl. No. 32,316
[22] Filed Apr. 27, 1970
[45] Patented July 13, 1971
[73] Assignee The United States of America as represented by the Secretary of the Air Force

[54] MICROWAVE INTEGRATED POWER SENSITIVE COUPLER
6 Claims, 3 Drawing Figs.

[52] U.S. Cl. .......... 333/10, 307/237, 307/320, 333/17, 333/84 M
[51] Int. Cl. .......... H01p 3/08, H01p 5/14, H04b 3/04
[50] Field of Search .......... 333/10, 17, 24, 24 C, 84 M, 27, 81; 307/320, 321, 237

[56] References Cited
UNITED STATES PATENTS
3,012,210 12/1961 Nigg .......... 333/10
3,095,544 6/1963 Ayer et al. .......... 333/10

*Primary Examiner*—Herman Karl Saalbach
*Assistant Examiner*—Marvin Nussbaum
*Attorneys*—Harry A. Herbert, Jr. and George Fine

ABSTRACT: A microwave power sensitive coupler utilizing planar or strip line techniques having a coefficient of coupling, $K_{12}$, between the input or main arm and the coupled power dependent arm. Thus, the coupled power would remain substantially constant over large dynamic ranges of input power level.

INVENTORS.
JAMES D. WOERMBKE
HERBERT W. COOPER
BY Harry A. Herbert Jr
George Fine
ATTORNEYS

MICROWAVE INTEGRATED POWER SENSITIVE COUPLER

BACKGROUND OF THE INVENTION

The present invention relates broadly to a microwave power sensitive coupler and in particular to an improved coupler means that maintains a predetermined power sensitive coupling coefficient between the lines of a planar type transmission line.

In the prior art, various means have been employed to couple energy from one strip line to another. It is presently well known that energy flowing through a main strip line may be directionally coupled to a second independent strip line by placing the second strip line in sufficiently close proximity to the main strip line so as to a portion of the main strip line energy to flow therein. The amount of coupling between the lines as well as the directivity of the coupled energy will be prescribed by the various physical parameters associated with the coupled lines.

Many times, the amount of coupling between the main and the secondary strip line is not precisely as desired or required, therefore, small adjustments may be required. However, the prior art method of accomplishing this has been crude and inaccurate. For example, when the strip line comprised a pair of mirror image printed circuits in a dielectric material, the procedure would involve assembling the unit, measuring the coupling coefficient, disassembling the unit, adjusting the coupling between the conductors, and reassembling and remeasuring the coupling coefficient. A single unit may require a plurality of adjustments. Often the reassembled unit had an alignment of parts slightly different from the original alignment and thus requiring further adjustments.

SUMMARY OF THE INVENTION

The present invention utilizes a strip line microwave coupler apparatus having a particular coupling coefficient that is sensitive to the applied input power. The power sensitive coupling coefficient is obtained between the lines of a planar-type transmission line by utilizing voltage variable capacitance diodes or PN junctions between the lines. The effective RF coupling coefficient between the lines will vary accordingly with the magnitude of the diode junction capacity. A self biasing circuit which is connected between the input line of the strip line and ground provides the reverse bias voltage required for amplification to the interline coupling diodes. Therefore, as the power input increases, the bias voltage will increase and the reverse bias on the variable capacitance diodes will increase. Thus, the interline coupling capacitance will decrease and thereby produce a corresponding decrease in the interline coupling. When the power input decreases, the reverse bias conditions occur and provide capacitive coupling increase between the lines and thereby increase the interline coupling.

It is one object of the invention, therefore, to provide an improved microwave power sensitive coupler apparatus having a substantially constant coupling coefficient between the planar transmission lines.

It is another object of the invention to provide an improved power sensitive coupler apparatus to maintain the power coupling level substantially at a constant over large dynamic ranges of input power levels.

It is yet another object of the invention to provide a coupler apparatus having a coupling coefficient inversely proportional to input signal level to maintain maximum sensitivity and low level drive, while automatically being protected from excessive or burn out signal levels.

DESCRIPTION OF THE PREFERRED EMBODIMENT

Figure 1:
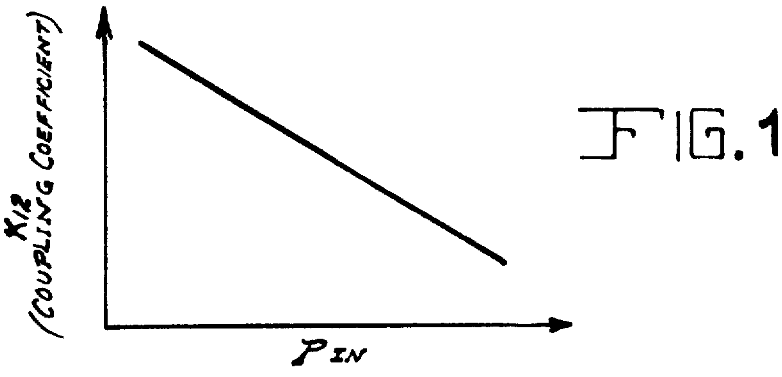
FIG. 1 is a graphical representation of the coupling coefficient versus the input power level.

Referring now to FIG. 1, there is shown a graphical representation of the coupling coefficient, $k_{12}$, plotted against the power in, $P_{in}$, of a RF power coupler (not shown) having a coefficient of coupling, $k_{12}$, between the input or main arm and the coupled power dependent arm. A coupler device having characteristics as shown in FIG. 1 would result in a RF microwave limiter or a constant power coupling apparatus in which the coupled power would remain substantially constant over large dynamic ranges of input power levels. Devices having this characteristic have applications in signal detection systems in which tight coupling is desired at low input signal levels and weak coupling at high signal levels. Thus, the diode detector element which is utilized to monitor the input level to the coupler apparatus, may be of maximum sensitivity and low drive level and yet it is automatically protected from excessive or burn out signal levels. Therefore, in the area of electronic counter measures signal detection and processing where the incoming signal levels can vary over a large dynamic range, there is an immediate application for the present invention.

Figure 3:
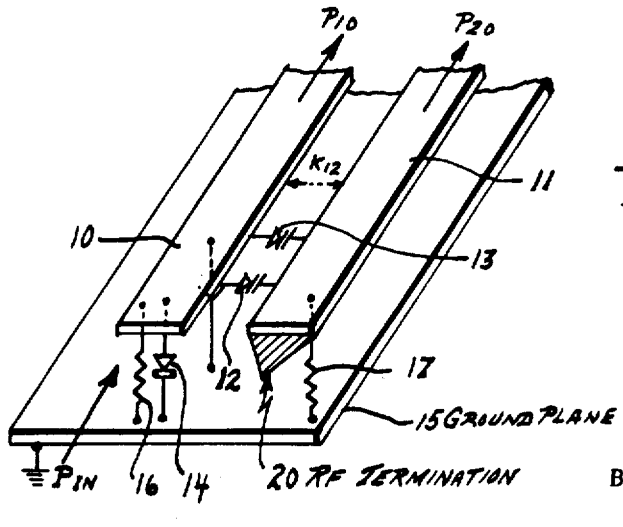
FIG. 3 is a pictorial representation of the microwave power sensitive coupler in accordance with this invention.

Referring now to FIG. 3, there is shown a microwave power sensitive coupler having a coupling coefficient $k_{12}$ between RF transmission lines 10, 11. The coupling coefficient, $k_{12}$, is established by utilizing voltage variable capacitance diodes 12, 13 or PN junctions between the lines 10, 11. The input or main arm of the apparatus is transmission line 10. The coupled power dependent arm is transmission line 11. An RF termination 20 is connected from coupled power dependent arm 11 to ground plane 15. The type of diode, 12, 13 that is utilized between the lines 10, 11, may be a varactor and exhibits a junction capacitance versus bias voltage characteristic (corresponding to that shown in FIG. 1) such that a substantially large value of capacitance exists at zero volts bias ($C_o$) and decreases with increasing reverse bias voltage to a minimum value ($C_{min}$) at reverse breakdown voltage ($V_b$). The effective RF coupling between lines 10 and 11 varies with the magnitude of the diode 12, 13 junction capacity. The larger the value of diode capacity the tighter the RF coupling. Similarly, the smaller the diode capacity the looser the RF coupling. Therefore, simply by varying the bias voltage on the diodes 12, 13 the effective RF coupling between the transmission lines 10, 12 can be controlled. The inter line coupling structure may be physically realized by an array of parallel cased diodes or diode chips in the case of a discrete element assembly or by a grown strip PN junction between lines 10 and 11 in the case of monolithic integrated circuit structures.

Figure 2:
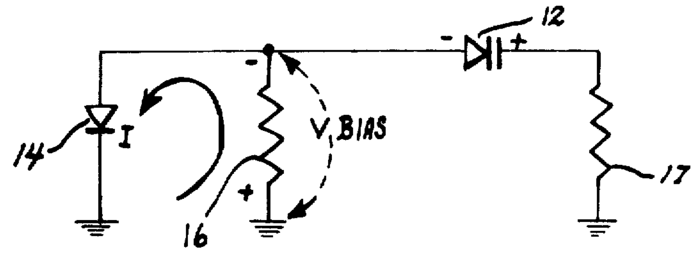
FIG. 2 is a schematic diagram of the self biasing circuit which is required to reverse bias, the inter line coupling diodes.

The required reverse bias voltage for application to the interline coupling diodes 12, 13 may be extracted from the incident main line 10 RF energy ($P_{in}$) via detector PN junctions or diodes 14 which is connected between line 10 and ground 15. A shunt resistance 16 which is required to develop the DC bias voltage is connected between transmission line 10 and ground plane 15. Diodes 14 (in the actual apparatus a series of diodes may be utilized) will be driven such that forward conduction occurs over a small portion of an RF cycle thus generating a component of DC current which will flow through resistor 16 generating a DC self-bias voltage. As the input power is increased more current will flow through resistor 16 which result in an increasing self-bias voltage ($V_{bi}$). This bias voltage is then applied to diodes 12, 13 in such a manner as to reverse bias the diodes, 12, 13 as illustrated by the simple equivalent circuit schematic diagram given by FIG. 2. The components of FIG. 2 are labeled with their corresponding number of FIG. 3 to clearly show their relationships to each other in the equivalent circuit and in the actual microwave power sensitive coupler apparatus. Resistance 17 is a DC ground return required for the DC biasing circuit operation and is of adequate resistance level so as to be of no significance to the RF circuit. The resistor 17 is connected as shown in FIG. 3 between coupled line 11 and ground plane 15.

As may be seen with the above outlined circuit, when the input power to line 10 is increased the resulting DC bias voltage increases and is of such polarity so as to reverse bias the coupling diodes 12, 13. As this biasing voltage increases in magnitude, there is a corresponding change in the magnitude of the junction capacity of diodes 12, 13 which decreases and results in a reduction of effective RF coupling between lines 10 and 11. The result is a power sensitive limiter or coupling device offering many system applications.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. A microwave power sensitive coupler apparatus having a coupling coefficient $k_{12}$ comprising in combination:
   - a main RF transmission line transmitting an R.F. signal;
   - A coupled power dependent line coupled to said main RF transmission line to receive a portion of said RF signal, said coupling being a coupling coefficient $k_{12}$;
   - A capacitance coupling circuit connected between said main RF transmission line and said coupled power dependent line to control said coupling coefficient $k_{12}$ in dependence on a control voltage;
   - A biasing circuit connected from said main RF transmission line and said coupled power dependent line to ground to provide said control voltage.

2. A microwave power sensitive coupler apparatus having a coupling coefficient $k_{12}$ as described in claim 1 wherein said capacitive coupling circuit is voltage variable.

3. A microwave power sensitive coupler apparatus as described in claim 1 wherein said capacitance coupling circuit comprises voltage variable capacitance diodes disposed between said main RF transmission line and said coupled power dependent line.

4. A microwave power sensitive coupler apparatus as described in claim 1 wherein said capacitance coupling circuit comprises PN junctions disposed between said main RF transmission line and said coupled power dependent line.

5. A microwave power sensitive coupler apparatus as described in claim 1 wherein said biasing circuit comprises a diode and a resistor in parallel coupled between said main RF transmission line and ground, a varactor disposed between said main RF transmission line and said coupled power dependent line, and a resistor coupled between said coupled power dependent line and ground.

6. A microwave power sensitive coupler apparatus as described in claim 5 wherein said biasing circuit varies the bias voltage to said varactor such that at zero volt bias said varactor has a substantially large value of capacitance and at reverse breakdown voltage said varactor has a minimum capacitance value.